(12) United States Patent
Lilja et al.

(10) Patent No.: US 8,133,442 B2
(45) Date of Patent: Mar. 13, 2012

(54) METHOD TO ENHANCE CLARIFICATION IN A MIXING REACTOR AND SAID MIXING REACTOR

(75) Inventors: Launo Lilja, Pori (FI); Bror Nyman, Ulvila (FI)

(73) Assignee: Outotec Oyj, Espoo (FI)

( * ) Notice: Subject to any disclaimer, the term of this patent is extended or adjusted under 35 U.S.C. 154(b) by 323 days.

(21) Appl. No.: 12/529,155

(22) PCT Filed: Feb. 28, 2008

(86) PCT No.: PCT/FI2008/050096
§ 371 (c)(1),
(2), (4) Date: Aug. 28, 2009

(87) PCT Pub. No.: WO2008/113884
PCT Pub. Date: Sep. 25, 2008

(65) Prior Publication Data
US 2010/0077889 A1    Apr. 1, 2010

(30) Foreign Application Priority Data
Mar. 16, 2007  (FI) .................................. 20070211

(51) Int. Cl.
*F27B 15/08* (2006.01)
*B01J 8/18* (2006.01)
*B01F 7/00* (2006.01)
(52) U.S. Cl. .......... 422/147; 422/140; 422/225; 366/320
(58) Field of Classification Search .................. 422/140, 422/147, 225; 366/320
See application file for complete search history.

(56) References Cited

U.S. PATENT DOCUMENTS 3,867,197 A * 2/1975 Reinhardt et al. ........... 134/25.5
3,954,452 A   5/1976 Makitalo et al.
4,702,891 A   10/1987 Li et al.

\* cited by examiner

*Primary Examiner* — Walter D Griffin
*Assistant Examiner* — Lessanework Seifu
(74) *Attorney, Agent, or Firm* — Chernoff, Vilhauer, McClung & Stenzel

(57) ABSTRACT

The invention relates to a mixing reactor for mixing a liquid and pulverous solid, clarification the solution that is formed and discharging the clarified solution from the mixing reactor, in the lower section of which a fluidized bed is formed. The invention also relates to a method for mixing a liquid and pulverous solid into each other in a fluidized bed, for clarification the solution that is formed and for discharging the clarified solution from the mixing reactor.

20 Claims, 6 Drawing Sheets

PRIOR ART

METHOD TO ENHANCE CLARIFICATION IN A MIXING REACTOR AND SAID MIXING REACTOR

Figure 1:
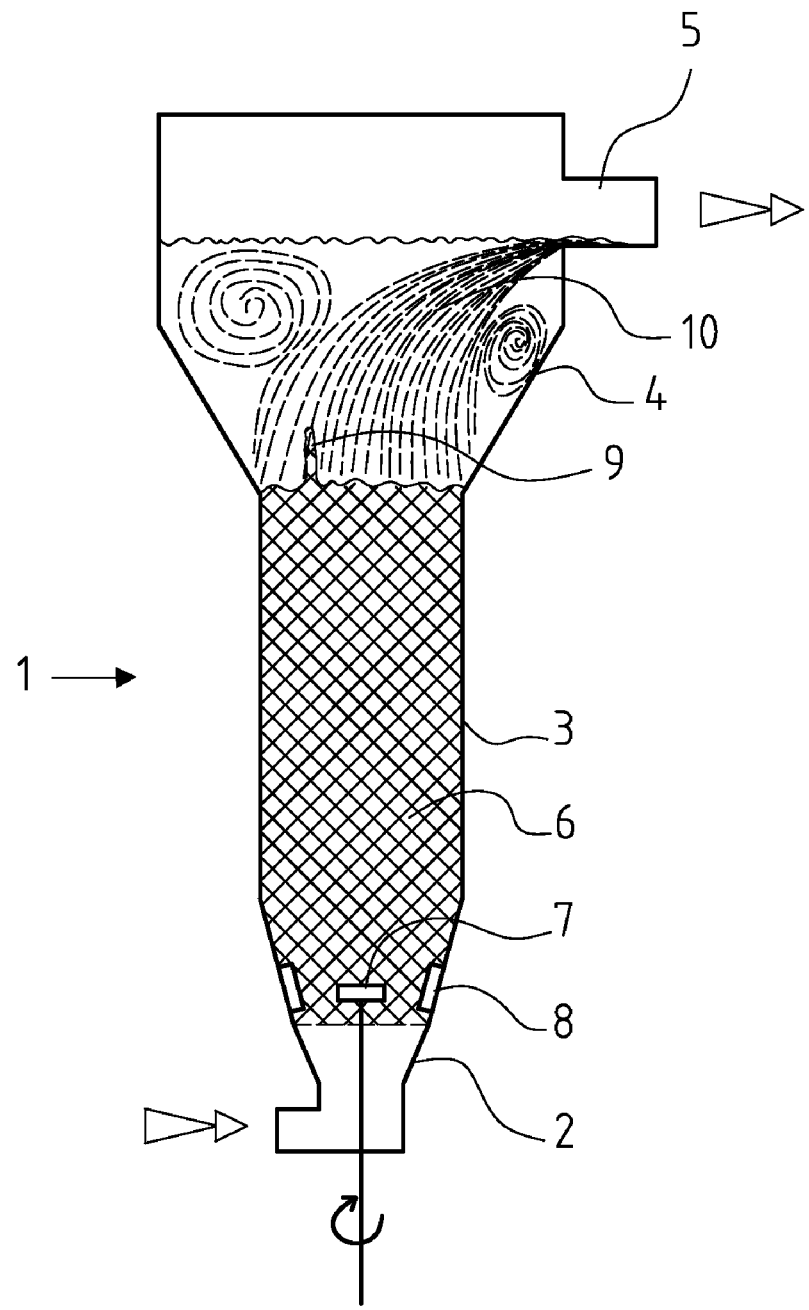

This is a national stage application filed under 35 USC 371 based on International Application No. PCT/FI2008/050096 filed Feb. 28, 2008, and claims priority under 35 USC 119 of Finnish patent application Ser. No. 20070211 filed Mar. 16, 2007.

FIELD OF THE INVENTION

The invention relates to a mixing reactor for mixing liquid and a pulverous solid, clarification the solution that is formed and removing the clarified solution from the mixing reactor, the lower section of which comprises a fluidized bed. The invention also relates to a method for mixing the liquid and pulverous solid into each other in a fluidized bed, for clarifying the solution that is formed and for removing the clarified solution from the mixing reactor.

BACKGROUND OF THE INVENTION

Mixing reactors are generally cylindrical and have standard diameters. Typically they are equipped with baffles attached on the reactor walls, with the purpose of removing a central vortex that sucks gas from the surface, which is considered harmful. Solids-solution processes normally require mixing, which includes both powerful turbulence and adequate circulation.

Feeding into the mixing reactor usually takes place by feeding both the solid and the solution into the reaction space from above. Generally it is desired that in a reactor operating continuously both solids and solution be removed more or less at the slurry density of the reaction space. Thus it is not desirable that even the heaviest or coarsest particles remain in the reactor. Thereby it is natural that the removal of the slurry stream can be installed advantageously in the reactor wall, occurring mainly as the overflow.

However, there are cases in which one wishes to remove the solution that has reacted with the solids from the reaction space in pure form, i.e. without solid particles. One such case is presented in U.S. Pat. No. 3,954,452, in which the cementation reaction of cadmium solution and zinc powder is carried out on the fluidized bed principle. When the solution is fed into the lower section of the reaction zone, efficient mixing is achieved in the fluidized bed. The lower part of the reactor widens conically upwards and is cylindrical in shape from that point upwards. There are baffles in the wall of the lower part of the reactor, which in conjunction with the mixing element crush any agglomerates that are generated. The upper part of the reactor also widens conically upwards. The reactor consists thus of three zones: the reaction, calming and clarification zones, whereby the reaction section is the lower part of the reactor, the centre forms the calming section and the upper section the clarification zone. A mixing element to accomplish the actual mixing is not used here.

In the method according to U.S. Pat. No. 3,954,452 the solution from the fluidization zone rises via the conical widening to the clarification zone, where the solution removal unit is on the wall of the clarification section. The process presented is the cementation of cadmium solution and zinc powder. In this cementation reaction cadmium powder is formed, which is lighter due to its porosity and at the same time also finer. One purpose is to prevent the solid particles formed as reaction product from exiting the reactor with the solution. Another difficulty found in this case has also been the sticking to each other of the barb-like particles i.e. agglomeration. Gradually the agglomerates grow so large that movement in the fluidized bed deteriorates and finally stops completely. For this reason a flocculant solution to prevent agglomeration is fed into the fluidization zone. Since prevention is not completely perfect in practice, a mixing element to crush the agglomerates is located in the lower section and correspondingly smallish baffles are located on the walls to absorb the impact force and prevent vortices.

How strong and how high from the surface of the fluidized bed ($H_{max}$) the upward-directed discharges reach is dependent on the conditions of the fluidization zone. Thus it is important that the stream rises above the aforementioned height as uniformly and at as low a speed as possible.

However, in practice what happens is that the solution flows as directly as possible and by the shortest route towards the removal unit, so that the flow field becomes a tapering curved cone. This in turn means that the speed of the solution stream carrying any possible particles increases and there is no chance for the particles to free themselves from the flow.

The problem with the equipment described above is that the bed material preventing the removal of solids should be fairly coarse. However, as the reactions proceed, the particle size of the solids in the bed decreases, whereupon the amount of solids carried along with the solution increases.

PURPOSE OF THE INVENTION

The purpose of the invention presented here is to remove the drawbacks that arise in the techniques of the prior art described above. Therefore a mixing reactor, in which a fluidized bed comprised of a liquid and solids is formed, so that the amount of solids contained in the solution removed from the fluidized bed is as small as possible.

SUMMARY OF THE INVENTION

The mixing reactor according to the present invention is intended for mixing a liquid and solid into each other in a fluidized bed, for clarification the solution formed and for removing the clarified solution from the reactor, which consists of three sections. The lowest is typically a cylindrical reaction section, into which the solution to be treated and the pulverous solid are fed to form a fluidized bed. The upper part of the fluidized bed section or reaction section is connected to a conically upward-widening calming section. Connected to the upper part of the calming section there is a cylindrical clarification section, which has a diameter that is the same as that of the upper part of the calming section. The lower section of the reaction section is equipped with a feed unit and a discharge unit is located in the clarification section below the surface of the liquid, whereby the discharge opening is essentially on the central axis of the reactor. At least one guiding element to direct the solution flow is positioned in the vicinity of the discharge opening to prevent the flow of solid particles with the solution.

According to one embodiment of the invention the feed unit for the liquid to be fed is directed obliquely downwards.

According to one embodiment of the invention the discharge unit of the settled solution is directed obliquely downwards and the guiding element directing the solution flow is an annular flow prevention plate, which is positioned around the discharge opening.

The flow prevention plate can be flat or upwardly conical. The outer diameter of the flow prevention plate is preferably 20-30% larger than the diameter of the reaction section.

As the discharge unit of the settled solution is directed obliquely downwards, the guiding element directing the solution flow in addition to the annular flow prevention plate also preferably includes a guiding ring above the latter, directed towards the center of the reactor from the reactor wall. Typically the guiding ring extends inwards from the reactor wall for a distance that is of the order of 10-30% of the diameter of the clarification section.

According to another embodiment of the invention, the discharge unit of the clarified solution is directed upwards and the solution flow guiding element is an adjusting plate, which is located below the discharge opening.

According to one embodiment of the invention, a throttle ring directed inwards from the reactor wall is located between the reaction section and the calming section. Preferably a gap is left between the throttle ring and the reactor wall.

According to one embodiment of the invention the reaction section is equipped with a rotor mixer made from a spiral-like tube.

The invention also relates to a method for mixing a liquid and pulverous solid into each other in a fluidized bed, for clarification the solution that forms and removing the clarified solution from an mixing reactor. A fluidized bed composed of liquid and solids is arranged in the lower part of the reactor, its reaction zone (I), a calming zone (II) above it, the cross-section of which widens upwards, a clarification zone (III) above this, the cross-section of which is the same as the upper part of the calming zone (II). It is typical of the method that the cross-sectional area of the upwardly rising solution flow in the clarification zone (III) is made to widen by means of at least one guiding element before the solution is removed, mainly via the discharge opening of the discharge unit located in the central axis of the reactor. As the cross-sectional area widens, the flow rate of the solution decelerates and simultaneously the flow is made to form back eddies in the vicinity of the reactor wall, into which the solid particles carried along with the solution settle. They then fall back into the fluidized bed.

According to one embodiment of the method according to the invention, the liquid to be treated is fed into the lower part of the reaction zone in an oblique downward direction.

According to one embodiment of the method according to the invention, the cross-sectional area of the upwardly rising solution flow is made to widen by means of an essentially horizontal plate-like guiding element located below the discharge unit.

According to another embodiment of the method according to the invention, the cross-sectional area of the upwardly rising solution flow is made to widen by means of an annular guiding element located around the discharge unit.

According to a third embodiment of the method accordant with the invention, the cross-sectional area of the upwardly rising solution flow is made to widen by means of an annular guiding element located around and above the discharge unit.

When the cross-sectional area of the upwardly rising solution flow is made to widen by means of an annular guiding element located around and above the discharge unit, it is preferable that the guiding element situated above extends from the reactor wall annularly inwards by a distance that is in the order of 10-30% of the diameter of the clarification zone.

The solids content in the clarification section of the upper part of the reactor is preferably regulated to be around zero. The formation and maintenance of a fluidized bed is achieved by means of the solution flow to be fed into the lower section of the reactor, which attains the required mixing.

According to one embodiment of the method accordant with the invention, a rotating mixing element fit for the purpose is used in the reactor in the fluidized bed in order to enhance mixing and balance out the solution flow.

The essential features of the invention will be made apparent in the attached claims.

LIST OF DRAWINGS

Figure 2:
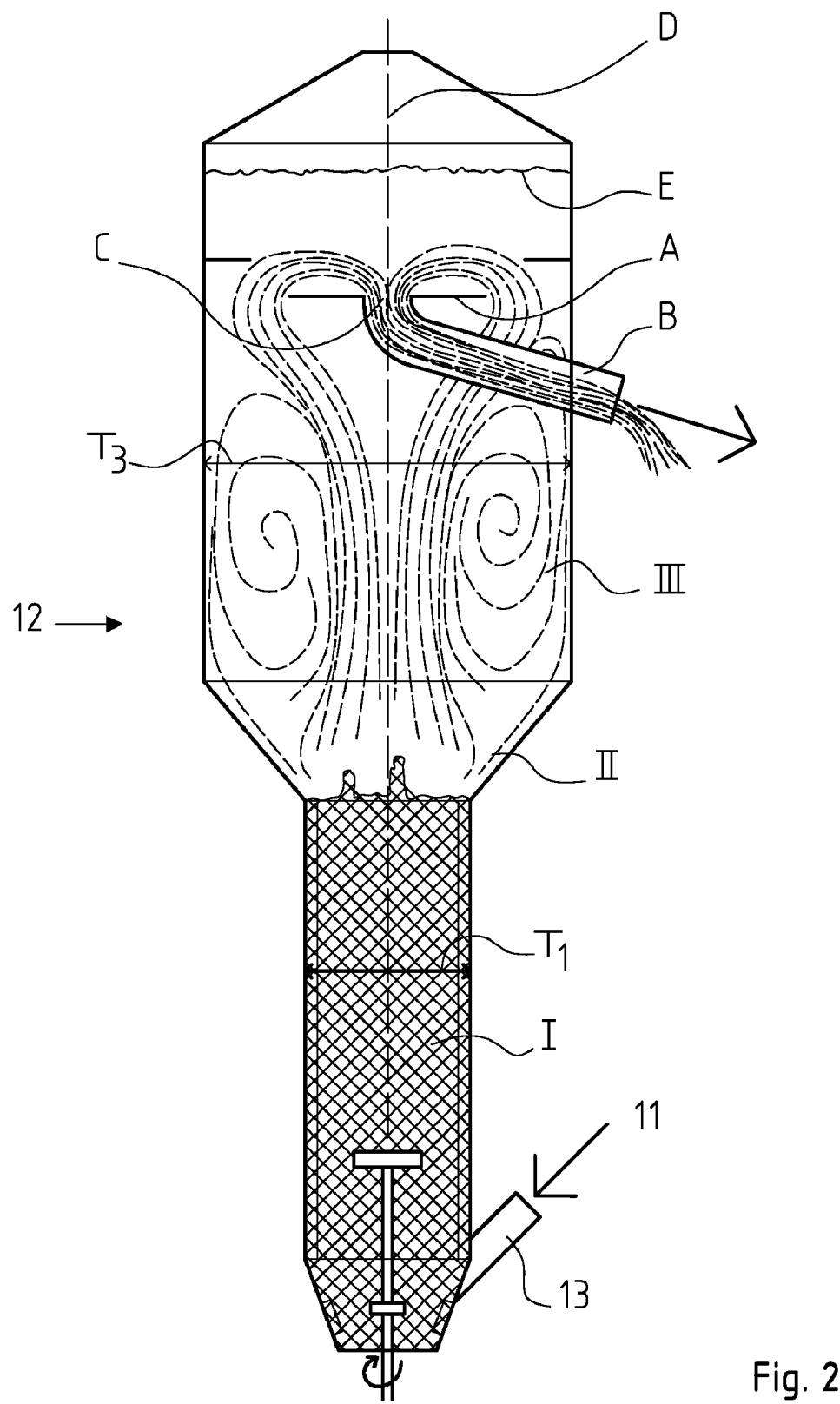
Figure 3:
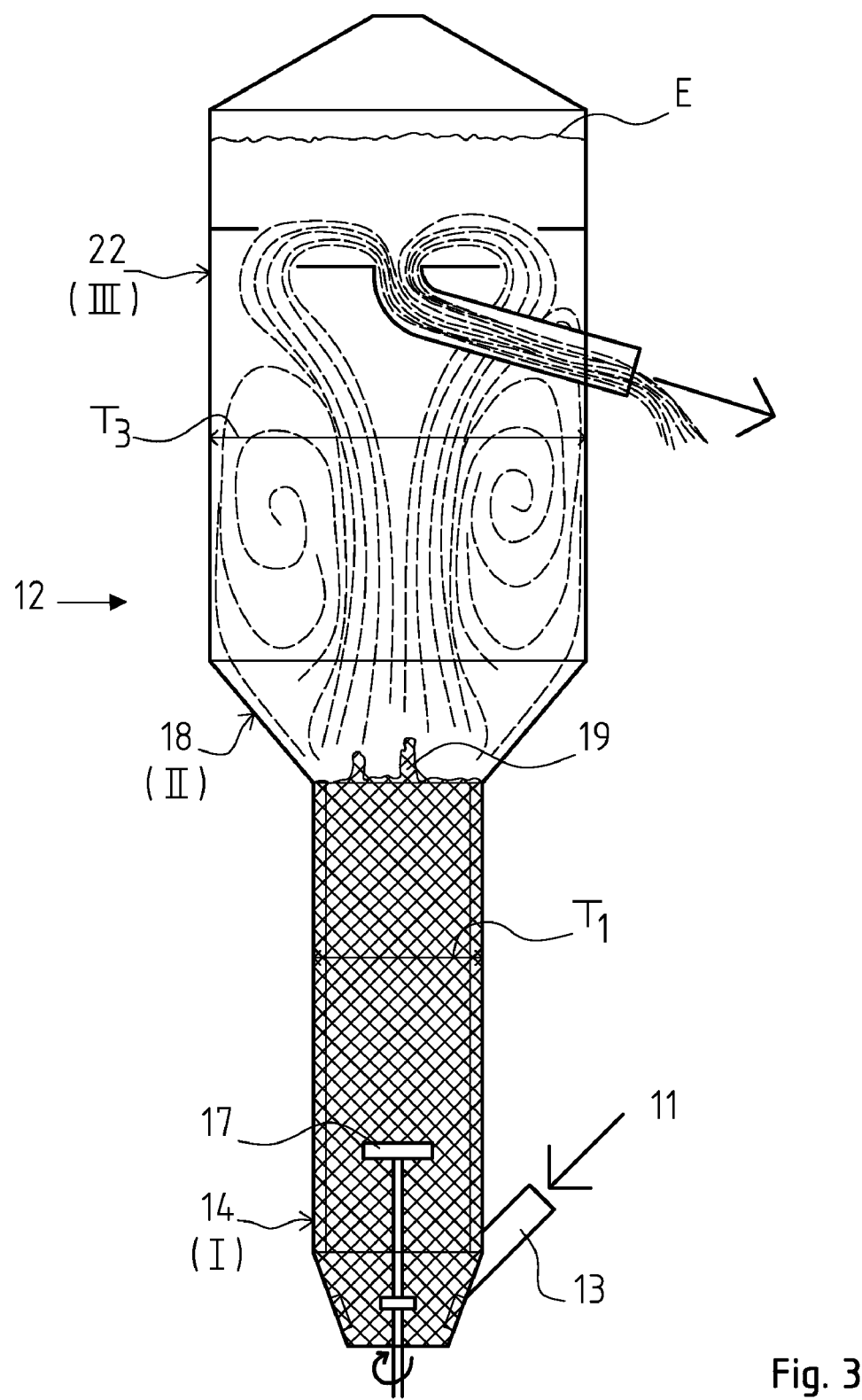
Figure 4:
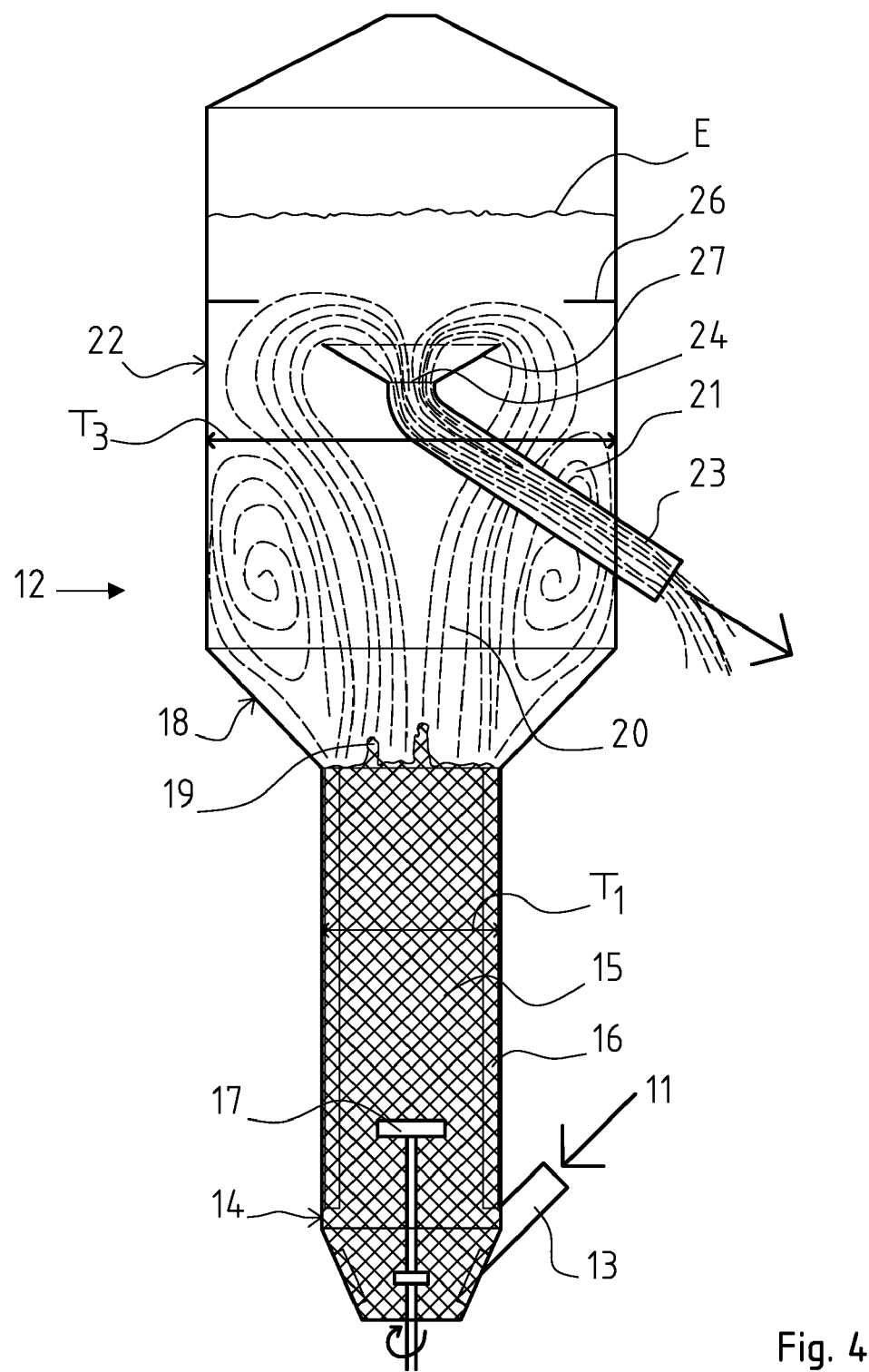
Figure 5:
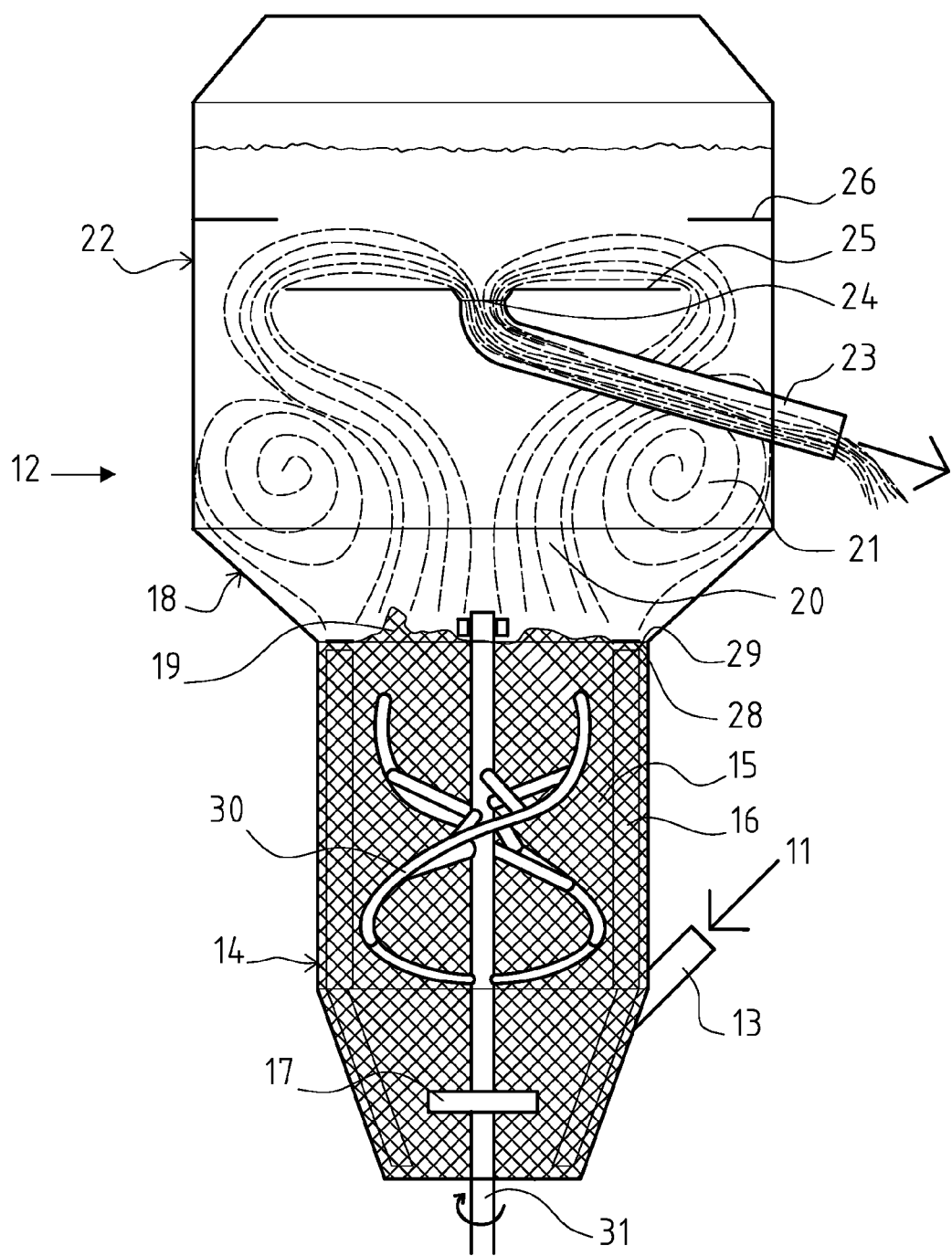
Figure 6:
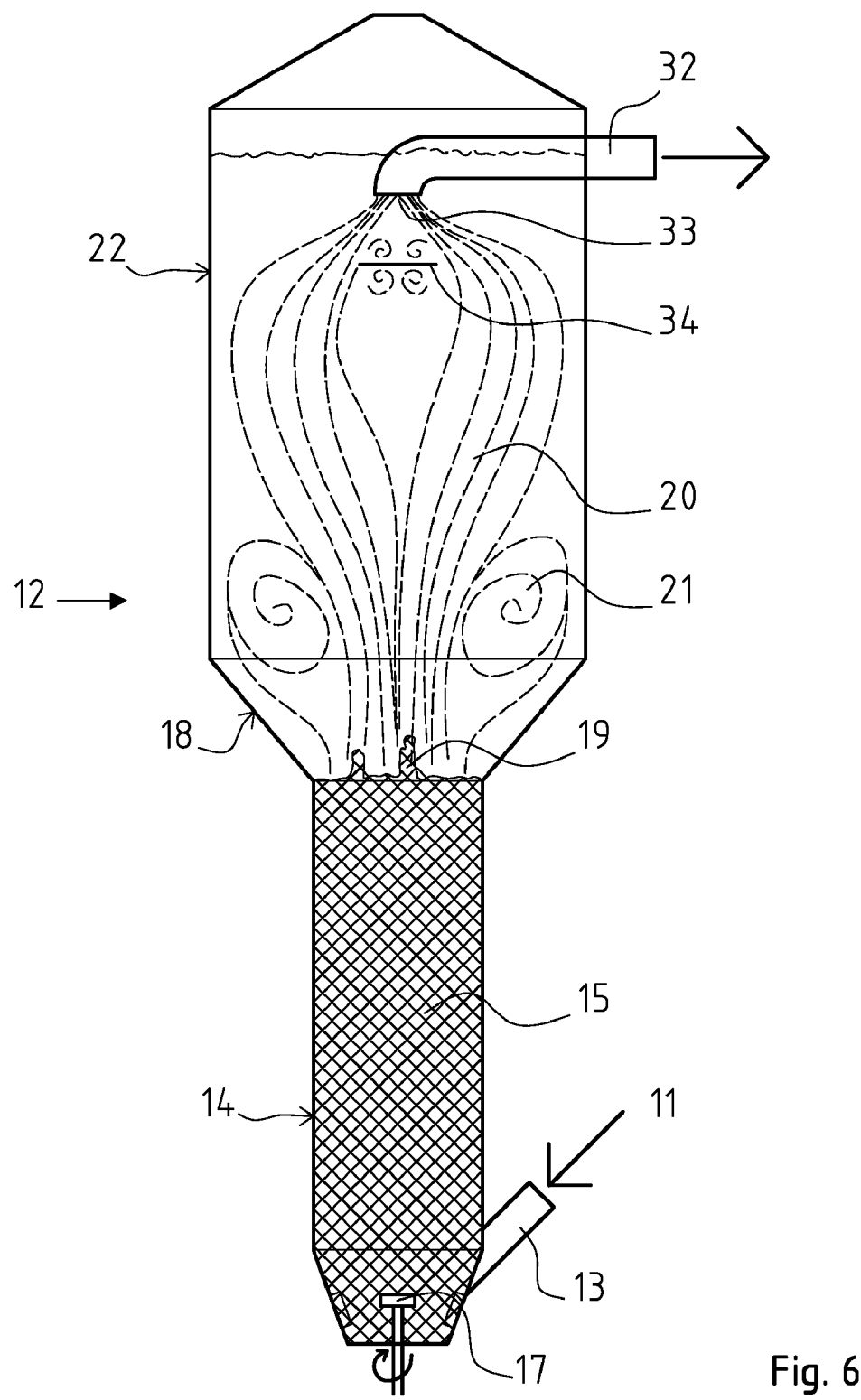

The equipment according to the invention is described in more detail with reference to the attached drawings, in which FIG. 1 presents a vertical section of a mixing reactor of the prior art with its flow fields, FIG. 2 presents a vertical section of a principle drawing of a mixing reactor according to the invention, FIG. 3 presents a vertical section of the mixing reactor according to FIG. 2 in more detail, FIG. 4 presents a vertical section of another mixing reactor accordant with the invention, FIG. 5 presents a vertical section of a modification of a mixing reactor accordant with the invention, and FIG. 6 presents a vertical section of yet another mixing reactor accordant with the invention.

DETAILED DESCRIPTION OF THE INVENTION

The purpose of the method according to the invention is to obtain the kind of flow field in a mixing reactor that facilitates attempts to prevent the removal of solid particles from the fluidized bed arranged in the actual reaction section. Thus the aim is to form a clarified solution and prevent the discharge from the reactor of particles rising from the reaction section with the solution stream and to return them finally back to the lower section of the reactor.

The method now developed according to the invention for achieving a controlled and desired flow field in a mixing reactor is based on the balancing effect on the solution discharge flow of the fluidization zone of the reactor or the reaction section and particularly the decelerating and also controlling effect of the flow rate caused by the guiding elements of the clarification section of the reactor. The balancing effect of the fluidization zone can be further optimized with an appropriate mixing element.

FIG. 1 presents a mixing reactor according to the prior art 1, in which a liquid and solid are treated so that the pulverous solid forms a fluidized bed and at the same time reacts with the liquid fed into the lower section 2 of the reactor. The lower section 2 of the reactor widens upwards conically and extends upwards in the middle section 3 forming a cylindrical shape. The upper section 4 of the reactor also widens upwards conically. The solution, which is largely free of solids, is removed from the upper section of the reactor, via a discharge unit 5 located in its wall. Attention is paid to increasing the contact surface in the reactor between the solid and the solution and to exploiting the energy of the solution stream itself. Therefore a fluidization zone 6 with a high slurry content is formed in the central section of the reactor. In addition the reactor is equipped with a propeller 7 and baffles 8 for crushing agglomerates, which are used on the one hand to attempt to prevent the formation of agglomerates and on the other hand to break down the agglomerates that form into single solid particles. The formation of agglomerates is also prevented by feeding a flocculant continuously into the solution.

It is known that in certain conditions, slurry jets 9 form on the upper surface of the fluidized bed in the mixing reactor, which are directed upwards and which are of fluidized bed category in slurry density and particle size. The height of the jets $H_{max}$ can be calculated theoretically. This means that all sizes of solids particles appear up to this height. Another flow-related phenomenon, which results in solid particles ending up in the solution discharge stream is the fact that the flow in fact normally aims for the discharge opening as directly as possible. Thus a stream 10 is formed directed towards the discharge unit 5, where the cross-sectional area of the stream is reduced continuously. This in turn means that the flow rate in the flow field increases at the same rate. If the surface of the fluidized bed were even, the settling rate and said flow rate would determine the particle size of the solid particles leaving with the solution. However, the aforementioned jets that are launched upwards are able to raise particles to the $H_{max}$ height, even those of a greater settling rate, so that their flow rate is greater than that on the surface of the bed. As a result, the solid particles are discharged from the bed in ever greater amounts. As one may suppose, an expanded upper section is not a solution in itself, although it no doubt improves the situation. The increase in height of the expanded upper section naturally helps to prevent the removal of solid particles.

The flow event and mixing reactor belonging to the method according to the invention are first illustrated in a simple embodiment shown in FIG. 2. The mixing reactor comprises three zones: the actual reaction zone or fluidization zone I, the calming zone II and the clarification zone III.

The reaction zone I is mainly cylindrical, with a constant cross-sectional area. The lower section alone narrows conically downwards. The solution to be treated 11 is fed into the mixing reactor 12 with a tube 13 directed obliquely downwards into the lower section of the fluidization zone formed by the pulverous solid and the solution. In this simple way a uniform, upward flow is attained. In many cases harmful agglomerates are not generated, so at its simplest, crushing and grate mixers are not even required, and therefore neither are baffles.

In certain conditions, there form jets of slurry directed upwards from the surface of the fluidization layer in the calming zone II. In this section the solid particles that had left the upper part of the fluidized bed with the solution, but then separated from it, return to the reaction zone.

The diameter T3 of the reactor in the clarification zone III is from 1.5 to 3.0 times that of the diameter T1 of the reaction part, preferably between 2 and 2½ times, whereupon the average rising rates of the solution fall to between 0.44 and 0.11 times that of the rising rate occurring in zone I, and correspondingly to between 0.25 and 0.16 times in the preferred case.

In accordance with the invention, an plate-like guide member A is positioned in the middle of the clarification zone. The guide member forces the solution flow that rises from the centre of the zone towards the side walls, so that the flow is slowed down. Since the plate-like guide member is an annular flow prevention plate, which is positioned around the discharge opening C of discharge unit B, its outer diameter is larger than the diameter T1 of reaction zone I, preferably around 20 to 30% larger. It is typical of the method and equipment accordant with the invention that the discharge unit for removing the solution from the reactor is located in the upper section of the clarification zone, on its central axis D, but below the liquid surface E. The solution is removed from the reactor via the discharge unit and the discharge unit is typically directed either obliquely downwards and on through the sidewall or alternatively mainly straight upwards. The inclination of the discharge unit has no major effect in principle, because the solution does not contain a significant amount of solids that could settle on the bottom of the unit.

When the above-mentioned average relative solution speeds are 100% in the reaction zone (I) and 22% in the clarification zone (III), then in reality they are 100% in the reaction zone, 62% in the middle stages of the clarification zone and 29% near the lowest guide plate. This means that as the rate falls to 30%, some of the particles that are carried along drop out of the flow precisely because of the clarification rate. When furthermore the solution in the upper section falls into a curve flow, the proportion of separating particles grows as a result of the cyclone effect. The sizeable lateral vortices directed towards the edges of the central section return the separated particles to the reaction zone I.

The fluidization bed itself in the reaction zone prevents the discharge of fine particles and reduces the loosening of particles that have risen to the surface of the bed along with the solution. The retention of solid particles in the bed may be optimized with the advantageous placing of the solution feed, for instance by feeding the solution obliquely downwards in accordance with FIG. 2. In addition, a mixing element may be used in the fluidized bed, which replaces the grate generally located below the fluidized bed. It has already described above at least one flow guide located in the clarification zone. A discharge flow smaller than the particle clarification rate is achieved by extending the upper clarification zone and locating the discharge opening symmetrically on the central axis of the clarification part. The intensified stabilizing of the flow and the formation of cyclonic vortices is achieved with at least one flow guide in accordance with our invention.

A mixing reactor according to FIG. 2 is illustrated in FIG. 3 with more detail. The solution to be treated 11 is fed into the mixing reactor 12 with in practice one tube 13 directed obliquely downwards into the reaction zone in the lower section of the reactor i.e. the fluidized bed section 14 (I). The powder to form the fluidized bed is fed for example in batches in the known manner. The removal of the reacted bed also takes place in the known manner. The aim is not to decrease the amount of powder acting as the bed, instead its purpose is to react with the solution. The intention is also to achieve the most even, upward-rising fluidization effect as possible between the pulverous solid and the solution. As is well known, fluidization provides the most effective chafing and variability to the contact surfaces between particles and solution. In principle, the dimensioning of the lower section is made on the basis of the delay and fluidization level required by the reactions. The fluidization level means the void between solids and solution i.e. the proportion of the solution in the total volume $\epsilon$, which is normally in the region of $0.5<\epsilon<0.9$. The fluidization level together with the particle size determines the behaviour of the bed, in other words e.g. whether it is calm or forms jet-like eruptions.

The fluidized bed 15 has the necessary number of flow baffles 16 situated in the sidewalls of the reaction section. Sometimes in the reactions agglomerates start to form from the solid particles, and their bond has to be broken by a mechanical crushing mixer element 17, such as the one pictured in the reactor of FIG. 1.

The solution exiting the reaction section 14 for the calming section 18 (II) includes a certain amount of solid particles, which are fairly fine in particle size, and this amount is determined by the rising rate of the solution and the clarification rate of the particles, as well as the height of the afore-mentioned slurry eruptions 19. In the preferred case, the solution flow is so even that its rising rate can be calculated approximately from the formula w=Q/A where w=the average rising rate of the solution [m/s] calculated across the entire cross-section area of the reaction section, Q=the solution flow [m³/s] and A=the cross-sectional area of the reaction section [m²]. Usually when calculated this way, the solution attains sufficient speed that the downward-directed back eddies 21 typical of eruptions are formed around the rising flow 20 i.e. a cyclone effect. These eddies try to constrict the upward flow and thus promote the carrying along of particles with the solution. The situation is slightly improved by the conically upward widening calming section.

In order for the solid particles in the clarification section 22 (III) that separated from the fluidized bed to be made to return to the bed, the clarification section has to be big enough in diameter and particularly in height, in the range of 1½-2 times that of the diameter of the clarification section. Especially in larger reactors this is unfeasible and other means are required. In the method and equipment accordant with our invention, this has been solved simply with the use of guide elements. The discharge opening 24 of the reacted solution discharge unit 23 is located symmetrically on the central axis of the reactor, where a horizontal annular flow prevention plate 25 is attached to the upper edge of the discharge unit. A guide ring 26 directed from the wall towards the centre of the reactor is located at some distance above the flow prevention plate. As a result of the flow prevention plate 25, the solution flow 20 rising up from the centre of the reactor is directed towards the edge of the clarification section, so that as the cross-sectional area grows, the speed is reduced. The guide ring 26 means that the flow is turned towards the centre and on to the discharge opening 24. Thanks to the inertial force occurring in the curve near the wall in the area between the guide elements 25 and 26, the particles diverge from the discharge stream towards the wall and move into the downward-directed back eddy 21 near the wall and then back to the reaction section 14.

When another flow guide element is positioned in the upper part of the clarification zone 22 (III) in accordance with the invention, this guide ring 26 is arranged so as to be above the flow prevention plate 25. The guide ring is attached to the wall so that an annular gap is left between the flow prevention plate and the guide ring when seen from above. The vertical distance between the guide elements is determined by the ratio between the diameters of the clarification and reaction zones. The width of the guide ring is from 10% to 30% of the diameter of the clarification zone.

The flow prevention plate 25 may be flat in principle, because there is no significant amount of solid particles in the flow. If there is reason to fear that solids will accumulate on top of the plate 25, it should be formed into a funnel shape. This is presented in FIG. 4, where the form of the lower clarification section guide element or flow prevention plate 27 is conical, so that its outer edge rises above the discharge opening. In this case the shape of the guide element prevents the possible accumulation of solids on top of the plate and in the solution.

The solution presented in FIG. 4 is in a way prepared for the coarse and possibly even heavy particles fed into the reaction section fluidization bed to be ground finer and lighter, when they react with the solution fed into the reactor. Over-fine solids (mostly below 400 mesh or 37 μm) cannot be completely prevented from rising with the solution flow from the reactor, even with the arrangement accordant with the invention. In this case it is necessary to accept a small amount of solids in the discharge. This means that the flat flow prevention plate is replaced by a conical plate 27, which when attached to the discharge unit 23 forms a funnel. Where necessary the inclination of the discharge unit can also be altered.

One alternative for stabilizing the flow in the fluidized bed 15 and improving the separation of the clarification section 22 is presented in the mixing reactor application according to FIG. 5. Immediately above the fluidization layer i.e. between the reaction section 14 and the calming section 18 there is a ring-like throttle control 28 directed inwards from the reactor wall. However, a gap 29 is left between the wall and the control, via which the solids-containing solution flowing down from the clarification section can settle in the fluidized bed. As the name suggests, the throttle control chokes the solution flow rising from the reaction section 14 and thus strengthens the vortex phenomenon of the clarification section 18 i.e. the separation of solids from the solution due to centrifugal forces. By means of the throttle control, the rising solution flow is focused even more intensely on the central axis, whereby the vortices in the rising flow near the wall are strengthened and the cyclone effect separating particles from the flow is improved.

Sometimes the distribution of the solution flow across the entire cross-section of the reaction section has to be enhanced with a suitable mixing element, especially when the grate construction used below the bed in solids-gas fluidization cannot be adapted sensibly for solids-gas fluidization. A mixer 30 is placed in the reaction section 14 of a mixing reactor according to FIG. 5, which is supported on the same shaft 31 as the crushing mixer 17. The mixer 30 is preferably a rotor mixer made of spiral tubes. This type of mixer is also able to rotate at high slurry densities. The purpose of the mixer is to mix the fluidized bed and prevent it from arching. The purpose is also to spread the rising solution flow as evenly as possible across the entire cross-section i.e. it can also be called a "grate mixer", because its purpose is to act as a grate replacement in the fluidized bed. When a mixer is used in the fluidized bed, the advantage is that a finer solid than earlier can be made to remain in the bed and will not be removed with the solution flow.

Provision is made in the embodiment shown in FIG. 5 for strong variations in capacity to occur. In this case, for instance as the solution stream becomes smaller, the fluidization state of the reaction zone may weaken, and may even change partially into what is known as a fixed bed, whereupon the movement of solid particles is reduced, weakening the shear stress required for the reactions. A mixer made of a spiral tubes enables not only the improved distribution of liquid and solid across the entire cross-section of the bed, but also a wide-ranging miscibility area in the reaction zone. If the mixer on the shaft is inserted from below, the upper section must be equipped with a centering support ring.

In the embodiment of a mixing reactor shown in FIG. 6, solid particles are prevented from travelling with the solution in a slightly different way to the previous resolutions. The solution is removed from the reactor 12 at the upward-directed discharge unit 32, which is nevertheless below the surface of the solution and specifically from the central reactor axis. In this way, a symmetry of flow is implemented, thanks to which the funnel-like flow of FIG. 1, which reduces in cross-sectional area, is not generated here either. Instead, a widening flow field is deliberately generated, where the solution flow rate in the clarification section 22 falls almost to the ideal average value.

A horizontal guiding element 34, which at its simplest is a circular adjusting shim, is set below the solution discharge opening 33. The shim works both as a guide plate, forcing the rising solution flow to expand laterally, and as a preventing plate, preventing the rising solution flow from straightening out directly into the discharge opening. The embodiment of a mixing reactor according to our invention shown in FIG. 6 is probably the simplest. Naturally, the adjusting shim may also be more close-fitting in shape to the flow, for instance conical in structure. Of course the shim that is presented here, as with the guide elements presented in the other figures, may be supported by the reactor wall as well as the edge of the discharge opening.

In all cases the regulation of the height of the surface takes place using normal technology.

EXAMPLES

Example 1

In the example a comparison is made between the prior art (A corresponds to FIG. 1, but the clarification section has been heightened to the size of FIG. 6) and our invention (B corresponds to FIG. 6). In both cases the basic reactor and process conditions are the same. Two different powder materials are used in both. In the reactor accordant with our invention (B) the diameter of the circular adjusting shim is ø=85 mm. These 4 different cases are presented in the following tables, where:

A1=a reactor of the prior art, when copper powder with a density $\rho_s$=8900 kg/m$^3$ is used in the reactor at the beginning of the process A2=a reactor of the prior art, when amalgam powder with a density $\rho_s$=4450 kg/m$^3$ is formed as the process cementation reactions proceed B1=a reactor accordant with the invention, when copper powder with a density $\rho_s$=8900 kg/m$^3$ is used in the reactor at the beginning of the process B2=a reactor accordant with the invention, when amalgam powder with a density $\rho_s$=4450 kg/m$^3$ is formed as the process cementation reactions proceed

TABLE 1

Reactor dimensions and run conditions plus the situation at the start

Reactor

| | | | |
|---|---|---|---|
| Diameter of lower section | $T_{lower}$ | mm | 150 |
| Diameter of upper section | $T_{upper}$ | mm | 345 |
| Effective height of lower section | $Z_{lower}$ | mm | 530 |
| Effective height of upper section | $Z_{upper}$ | mm | 600 |

Solution

| | | | |
|---|---|---|---|
| Flow quantity | Q | m$^3$/h | 1.3 |
| density | $\rho_l$ | kg/m$^3$ | 1230 |
| viscosity | $\eta_l$ | mPas | 1.9 |
| void rate in lower section | $w_{lower\ void}$ | m/s | 0.020 |
| void rate in upper section | $w_{upper\ void}$ | m/s | 0.0039 |

Pulverous solid

| | | | copper | amalgam |
|---|---|---|---|---|
| initial charge (coarse + fine) | $M_o + m_o$ | kg | 24.8 | 25.0 |
| fine portion at start | $m_o/(M_o + m_o)$ | % | 33.6 | 67.3 |
| density | $\rho_s$ | kg/m$^3$ | 8900 | 4450 |
| limit particle size ($w_{sett} = w_{sol}$) | $d_{lim}$ | µm | 96.4 | 148.7 |
| void (solution/whole bed) | $\epsilon$ | — | 0.67 | 0.74 |

TABLE 2

Powder screen analysis (same for both powder grades)

| Screen mesh | size mm | Passing through screen % |
|---|---|---|
| 30 | 0.595 | 100 |
| 40 | 0.420 | 99.4 |
| 50 | 0.297 | 96.5 |
| 70 | 0.210 | 87.2 |
| 100 | 0.149 | 67.5 |
| 140 | 0.105 | 40.0 |
| 200 | 0.074 | 17.3 |
| 270 | 0.053 | 5.5 |
| 325 | 0.044 | 2.5 |
| 400 | 0.037 | 1.1 |

TABLE 3

Situation at the end of the run

| Case | | | A1 | A2 | B1 | B2 |
|---|---|---|---|---|---|---|
| Final batch (coarse + fine) | $M_t + m_t$ | kg | 16.3 | 8 | 24 | 20.8 |
| "Fine" removed from reactor | $m_t$ | kg | 8.5 | 17 | 0.8 | 4 |
| "Fines" removed from end | $m_t/(M_o + m_o)$ | % | 34 | 68 | 3 | 16 |

This is a case of a cementation reactor, where copper powder is used as the initial charge in the fluidized bed. The solution flowing through reacts with the copper, whereupon amalgam particles are formed in the cementation reaction, and at some stage they are almost the size of the original Cu particles in grain size, but considerably more porous. Then their density decreases and at the same time the number of particles having the same settling velocity as the velocity of solution flow increases. The limit particle size ($d_{lim}$) has been calculated in the table, of which the clarification rate is the same as the rate of the solution flow as the solution rises from the fluidized bed towards the clarification section.

It was found that the arrangement in accordance with our invention enabled a significant reduction in the amount of powder removed from the reactor.

With copper powder: invention/prior art=B1/A1=3/34=0.09 i.e. approx. to 1/10

With amalgam: invention/prior art=B2/A2=16/68=0.24 i.e. approx. to 1/4

As the example shows, when using a reactor construction accordant with the invention, the amount of powder removed from the reactor with the solution fell in one alternative to a tenth and in an even more difficult case to a quarter.

Example 2

In the apparatus according to FIG. 4, silver was removed from a cuprous chloride solution using a copper powder-based fluidized bed. The diameter of the reaction section of the reactor, in which the fluidized bed was formed, was 1.5 m and the height 3.5 m. The lower part of the reaction section was equipped with a four-blade mixer intended for crushing agglomerates, which was a pitch blade-type and had a diameter of 0.6 m.

The diameter of the clarification section was 3.4 m and the height 4.5 m. A flow prevention plate was fixed around the discharge unit located in the clarification section, and in this case the plate was funnel-like and had an outer diameter of 1.8 m. In addition, the discharge flow of the solution was guided by means of a guiding ring, which was fixed so as to extend inwards from the wall of the clarification section by a distance of 0.45 m. The guiding ring was located above the flow prevention plate and at a distance of 0.4 m from the outer ring of the flow prevention plate.

The specific gravity of the concentrated cuprous chloride solution was 1230 kg/m$^3$, the pH 2.9 and the temperature 70° C. The solution was fed into the reaction section of the mixing reactor at 130 m$^3$/h. The feed solution contained 145 mg/l of silver, with the intention of cementing it onto the surface of the copper powder. The copper powder used was 85% below 110 micrometers in size. It was estimated that a fluidization level was achieved in the test that was set to correspond to an $\epsilon$ value of 0.7-0.8.

The test showed that after 15 minutes, the silver content of the cuprous chloride solution removed from the reactor was in the order of below 10 mg/l, where it also remained during the approximately twenty-four-hour testing period. The solids content of the solution to be removed from the reactor varied between 0.5 and 3.0 g/l, which can be considered an acceptable variation range.

The invention claimed is:

1. A mixing reactor (12) for mixing a liquid and a solid into each other in a fluidized bed, for clarification the solution that is formed and discharging the clarified solution from the reactor, whereby the reactor is composed of three sections, the lowermost of which is essentially a cylindrical reaction section (14) for the formation of a fluidized bed, attached to the upper part of the reaction section is a calming section (18) which widens conically upwards, and connected to the upper part of the latter there is a cylindrical clarification section (22), the diameter of which is the same as the upper section of the calming section, characterised in that the lower section of the reaction section (14) is equipped with a solution feed connection (13) and the clarification section (22) has a solution discharge unit (23,32) located below the liquid surface (E), the discharge opening (24,33) of which is essentially on the central axis of the reactor (D), and that at least one guiding element (25,26,27,34) for directing the solution flow is located in the vicinity of the discharge opening.

2. A mixing reactor (12) according to claim 1, characterised in that the feed connection (13) for feeding the liquid into the reactor is directed obliquely downwards.

3. A mixing reactor (12) according to claim 1, characterised in that the clarified solution discharge unit (23) is directed obliquely downwards and the guiding element directing the solution flow is an annular flow prevention plate (25,27), which is located around the discharge opening (24).

4. A mixing reactor according to claim 3, characterised in that the flow prevention plate (25) is flat.

5. A mixing reactor (12) according to claim 3, characterised in that the flow prevention plate (27) is upwardly conical.

6. A mixing reactor (12) according to claim 3, characterised in that the outer diameter of the flow prevention plate (25,27) is 20-30% greater than the diameter T1 of the reaction section (14).

7. A mixing reactor (12) according to claim 1, characterised in that the clarified solution discharge unit (23) is directed obliquely downwards and the guiding elements directing the solution flow are an annular flow prevention plate (25,27), which is situated around the discharge opening (24) and a guiding ring (26) above this, directed from the reactor wall towards the centre of the reactor.

8. A mixing reactor (12) according to claim 7, characterised in that the guiding ring (26) extends inwards from the reactor wall for a distance that is of the order of 10-30% of the diameter T3 of the clarification zone (22).

9. A mixing reactor (12) according to claim 1, characterised in that the clarified solution discharge unit (32) is directed upwards and the guiding element directing the solution flow is an adjusting shim (34), which is situated below the discharge opening (33).

10. A mixing reactor (12) according to claim 1, characterised in that a throttle ring (28) is placed between the reaction zone (14) and the calming zone (18) directed inwards from the reactor wall.

11. A mixing reactor (12) according to claim 10, characterised in that there is a gap (29) between the reactor wall and the throttle ring.

12. A mixing reactor (12) according to claim 1, characterised in that the reaction zone (14) is equipped with a rotor mixer (30) made from spiral tubes.

13. A method for mixing a liquid and pulverous solid into each other, for clarification the solution that is formed and for removing the clarified solution from a mixing reactor, whereby a fluidized bed is arranged in the reaction zone (I) of the lower section of the reactor, formed of a liquid and solids, with a calming zone (II) above it, with a cross-section that widens upwards, and a clarification zone (III) above this, which has the same cross-sectional area as the upper section of the calming zone (II), characterised in that the liquid to be treated is fed into the lower section of the reaction zone, the cross-sectional area of the solution flow rising upwards in the clarification zone (III) is made to expand by means of at least one guiding element (A) before the solution is discharged mainly via the discharge unit (B) located on the central axis (D) of the reactor, the flow rate of the solution is made to slow down by expanding its cross-sectional area and at the same time the flow is made to form back eddies in the vicinity of the reactor wall, into which the solid particles that have traveled along with the solution settle and fall back to the fluidized bed.

14. A method according to claim 13, characterised in that the liquid to be treated is fed into the lower section of the reaction zone in an obliquely downward direction.

15. A method according to claim 13, characterised in that the cross-sectional area of the upwardly rising solution flow is made to expand by means of an essentially horizontal plate-like guiding element located below the discharge unit.

16. A method according to claim 13, characterised in that the cross-sectional area of the upwardly rising solution flow is made to expand by means of an annular guiding element located around the discharge unit.

17. A method according to claim 13, characterised in that the cross-sectional area of the upwardly rising solution flow is made to expand by means of annular guiding elements situated around and above the discharge unit.

18. A method according to claim 17, characterised in that the cross-sectional area of the upwardly rising solution flow is made to expand by means of annular guiding elements situated around and above the discharge unit, whereby the guiding element situated above extends inwards from the reactor wall for a distance that is of the order of 10-30% of the diameter of the clarification zone T3.

19. A method according to claim 13, characterised in that the solution flow rising upwards from the reaction zone (I) fluidized bed into the calming zone (II) is stabilized by throttling.

20. A method according to claim 13, characterised in that the fluidized bed of the reaction zone (I) is mixed to stabilize the solution flow.

* * * * *